Sept. 1, 1959  L. E. GOFF, JR  2,902,626
PROTECTIVE RELAYING SYSTEM FOR AN ELECTRIC
POWER TRANSMISSION CIRCUIT
Filed Feb. 6, 1956
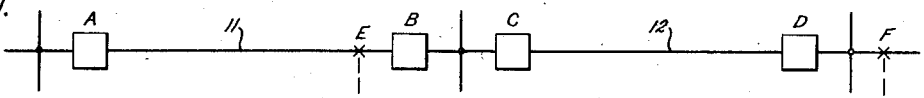
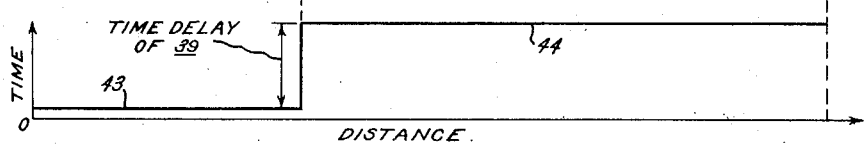
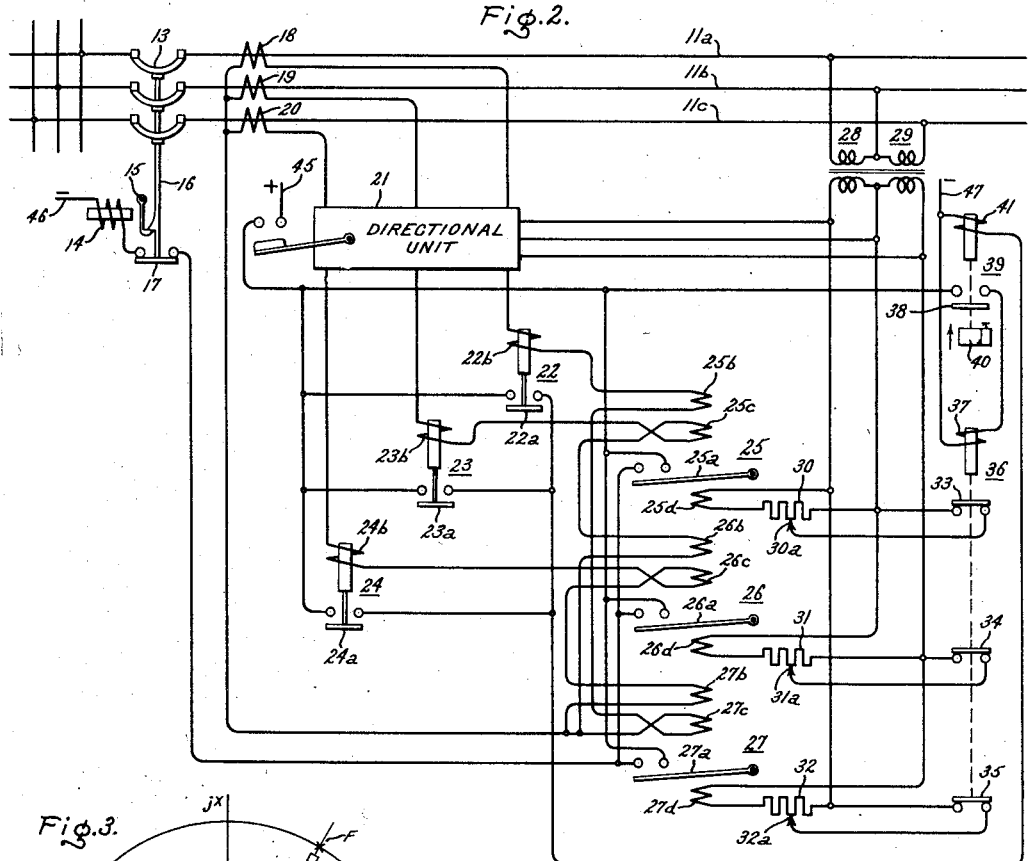
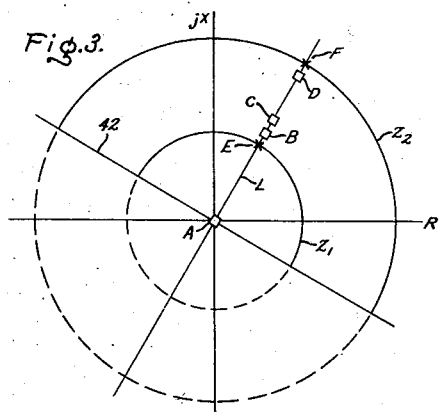
Inventor:
Leon E. Goff, Jr.
by J. Wesley Haubner
His Attorney.

United States Patent Office 2,902,626
Patented Sept. 1, 1959

2,902,626

PROTECTIVE RELAYING SYSTEM FOR AN ELECTRIC POWER TRANSMISSION CIRCUIT

Leon E. Goff, Drexel Hill, Pa., assignor to General Electric Company, a corporation of New York Application February 6, 1956, Serial No. 563,681

9 Claims. (Cl. 317—36)

This invention relates to relaying systems for protecting electric power transmission circuits, and more particularly to a system utilizing distance type relays for protecting an electric power "subtransmission" line.

The relatively short, lower voltage (less than 33,000 volts phase-to-phase) circuits of an electric power transmission system are commonly referred to as "subtransmission" lines. Subtransmission lines generally have been protected against fault or short circuit conditions by overcurrent or directional overcurrent relaying systems. The relatively complex and expensive distance or pilot relaying schemes which are employed on higher voltage transmission lines usually are not economically justified for subtransmission line protection.

Any relaying system for a subtransmission line must be capable of selective operation. To ensure that only the faulted section of the subtransmission line normally is removed from service upon the occurrence of a fault, the immediately adjacent relays should respond instantaneously. But to provide for an abnormal situation wherein the faulted line section is not instantly isolated from the source of power generation, the more remotely located relays associated with adjoining line sections should realize a delayed response to the fault. The latter slower, supplementary operation provides back-up or second zone protection. Since the operating speeds of time-overcurrent relays are affected by fault current magnitude which in turn depends upon the amount of generation, it becomes a difficult task to determine sensitivity and time adjustments so that these relays will operate selectively and give the proper degree of protection for all possible variations of connected generation capacity. Complicated system short circuit studies are often necessary, and where the variation between minimum and maximum generation conditions is very great, it may be impossible to obtain complete selectivity.

Accordingly, it is an object of this invention to provide for subtransmission line protection a simple, low-cost selective relaying system employing distance type relays which function substantially independently of fault current magnitude.

It is another object of the invention to provide a subtransmission line relaying system wherein instantaneous primary protection and delayed back-up protection are provided by distance relays in combination with instantaneous overcurrent and directional relays.

In carrying out my invention in one form, I provide for a 3-phase subtransmission circuit a polyphase instantaneous directional unit operable in response to electric power flow into the protected circuit. Three distance relays of the relatively uncomplicated and inexpensive impedance type are provided, each being associated with a different phase of the circuit. Each distance relay has an initial operating range which encompasses a predetermined portion of the protected circuit, and each operates instantaneously in response to a fault on this predetermined portion. A separate instantaneous overcurrent unit is provided for each phase and arranged to operate in response to a predetermined magnitude of circuit current, the predetermined magnitude corresponding to minimum fault current. I provide a timing device arranged to operate a predetermined time after operation of both the directional unit and any one of the overcurrent units for increasing the operating range of all three distance relays. Thus, upon the occurrence of a fault on the predetermined portion of the protected circuit, the directional unit and at least one distance relay operate immediately, while a more remote fault will cause immediate operation of the directional unit and eventual operation of a distance relay after the aforesaid predetermined time.

My invention will be better understood and further objects and advantages will be apparent from the following description taken in conjunction with the accompanying drawing in which Fig. 1 is a single line diagram of a typical subtransmission circuit; Fig. 2 is a schematic representation of a preferred embodiment of my protective relaying system as it is utilized at one terminal of the subtransmission circuit shown in Fig. 1; Fig. 3 is a graphical representation, in terms of impedance, of the operating characteristics of the directional unit and a distance type relay shown in Fig. 2; and Fig. 4 is a graphical time-distance representation of the operating characteristic of the relaying system shown in Fig. 2.

A section 11 of an electric power subtransmission line has been shown in the single line diagram of Fig. 1, and opposite ends of section 11 are designated terminals A and B. Another section 12 of the subtransmission line extends between terminals C and D, terminal C being connected to a common bus with terminal B. The subtransmission line sections 11 and 12 are of the type employed in an electric power system to transmit 3-phase alternating current of power frequency, such as 60 cycles per second, from one terminal to the other at relatively low voltage, i.e., 33,000 volts or less phase-to-phase. It is assumed, for the sake of convenient explanation, that the source of power generation is located behind or to the left of terminal A, as viewed in Fig. 1, and that load current normally flows from terminal A toward terminal D, although in fact generation may be present at other points in the subtransmission circuit and load current may sometimes flow in one direction and at other times in the opposite direction.

A protective relaying system is provided at each terminal to perform quickly a control operation, such as opening a circuit interrupter, upon the occurrence of a phase fault, i.e., upon the occurrence of a short circuit between phase conductors, at some point on the immediately adjacent subtransmission line section. The same relaying system is arranged selectively to coordinate with relaying equipment located at the other terminals, whereby the same control operation is performed in delayed response to a similar fault occurring on the next adjoining line section.

Fig. 2 illustrates the relaying system at terminal A. The phase conductors comprising the protected subtransmission line 11 are designated 11a, 11b and 11c. A 3-pole circuit interrupter 13, shown in its circuit making position and having an electroresponsive trip coil 14, is provided. Energization of trip coil 14 magnetically attracts a pivotally mounted latch 15 which releases a movable switch member 16 for rapid circuit interrupting action. Upon opening of circuit interrupter 13, an auxiliary switch 17 operates to deenergize trip coil 14.

Three current transformers 18, 19 and 20 are coupled to conductors 11a, 11b and 11c, respectively, at terminal A. As can be seen in Fig. 2, the Y-connected secondary circuits of these transformers supply a polyphase directional unit 21, instantaneous overcurrent units 22, 23 and 24, and the various operating windings of fault responsive relays 25, 26 and 27.

Directional unit 21, which has been shown in block form, may be of any suitable type responsive to the direction of electric power flow in the phase conductors 11a, 11b and 11c. For this purpose, unit 21 is supplied with voltages derived from the electric power circuit by a pair of potential transformers 28 and 29. An example of a relay which is suitable for this application is illustrated and described in U.S. Patent No. 2,110,673 issued to A. J. McConnell on March 8, 1938. The unit operates substantially instantaneously to close its contact 21a whenever alternating current flows into the protected line. Whenever a fault occurs behind terminal A, that is to the left of terminal A as viewed in the drawings, contact 21a is open thereby preventing ultimate operation of the relaying system as will become apparent hereinafter.

The instantaneous overcurrent units 22, 23 and 24 may be of any suitable type operable in response to a predetermined quantity of current. As illustrated in Fig. 2, the overcurrent units are electromagnetic attraction devices comprising normally open switch contacts 22a, 23a and 24a respectively, and having operating coils 22b, 23b and 24b supplied by current transformers 18, 19 and 20 respectively. Whenever an operating coil is energized by current in excess of a quantity which corresponds to a predetermined magnitude of line current in the associated phase conductor, the unit operates with no intentional time delay to close its switch contact. The predetermined magnitude of line current is less than the minimum value of fault current expected in the electric power circuit.

The fault responsive relays 25, 26 and 27 are conventional distance relays of the impedance type. Although these relays may be constructed in accordance with any one of several designs well known to those skilled in the art, the impedance relays which I have shown schematically in Fig. 2 by way of example comprise normally open movable switch contacts 25a, 26a and 27a, respectively, each being actuated by the resultant of opposing forces which are produced on the one hand by a pair of operating windings, 25b and 25c, 26b and 26c, and 27b and 27b, and on the other hand by a restraining winding, 25d, 26d and 27d.

The three switch contacts 25a, 26a and 27a are interconnected in parallel circuit relationship. A tripping circuit comprising contact 21a of the directional unit in series with the parallel combination of impedance relay contacts in series with auxiliary switch 17 connects trip coil 14 of circuit interrupter 13 for energization by a suitable source of direct voltage represented in Fig. 2 by the supply conductors 45 and 46. Thus trip coil 14 is energized and circuit interrupter 13 is tripped in response to operation of both the directional unit 21 and any one of the impedance relays 25, 26 and 27.

An impedance relay will operate with substantially zero time delay to close its contact whenever the force produced by its operating windings exceeds the force produced by its restraining winding. The operating force exerted on a switch contact is proportional to the net ampere turns of the associated pair of operating windings, while the restraining force tending to hold the switch contact open is determined by the ampere turns of the associated restraining winding. The operating windings, as shown in Fig. 2, are supplied with current directly proportional to the subtransmission line current at terminal A. The restraining winding is connected to the potential transformers 28 and 29 and thus produces restraining force proportional to the subtransmission line voltage at terminal A. The ratio of subtransmission line voltage to current when operating and restraining forces are equal will be a constant value of impedance which defines the operating range or reach of the impedance relay. For any voltage-current ratio less than this constant impedance, operating force must be greater than restraining force and relay operation is obtained.

In the illustrated embodiment of my invention, the relay operating range is controlled by an adjustably tapped resistor 30, 31 and 32, connected in series with the restraining winding, 25d, 26d and 27d respectively. These resistors determine the proportion of line voltage supplied to the restraining windings and thus affect the relative magnitude of restraining force. The resistors are provided with sliders 30a, 31a, and 32a respectively, and the adjustable portions of the total resistance of these resistors are normally shunted by closed contacts 33, 34 and 35, respectively, of an auxiliary relay 36. The total resistance and the tapped portion thereof are selected so that with the shunting contacts closed, each impedance relay has a predetermined initial operating range, while with the shunting contacts open, relatively less voltage is supplied to the restraining winding and the restraining force is weakened whereby a predetermined extended operating range is obtained.

The auxiliary relay 36 is provided with an operating coil 37 which is connected by the directional unit contact 21a and a normally open contact 38 of a timing element 39 to a source of substantially constant direct voltage represented in Fig. 2 by the supply conductors 45 and 47. With both of the contacts 21a and 38 closed, coil 37 is energized and auxiliary relay 36 is operated to open the normally closed shunting contacts 33, 34 and 35 thereby increasing the operating range of the impedance relays 25, 26 and 27.

Operation of the timing element 39 is controlled by the directional unit 21 and the overcurrent units 22, 23 and 24. Element 39 is actuated in delayed response to the operation of both the directional unit and any one of the overcurrent units. Although the timing element 39 could be of any well known type suitable for performing a timing function, I have chosen to illustrate by way of example an electromagnetic attraction device whose operation is delayed by the action of a dashpot 40. An operating winding 41 is connected to the source of substantially constant direct voltage by means of the directional unit contact 21a connected in series with a parallel connected combination of the overcurrent unit switch contacts 22a, 23a and 24a. Operating winding 41 is energized whenever the directional unit contact 21a and any one of the normally open overcurrent unit switch contacts are concurrently closed. A predetermined time after this energization is initiated, the timing element 39 operates to close its contact 38. The desired fixed time delay upon energization of element 39 is obtained by suitable adjustment of dashpot 40. The timing element 39 in conjunction with the auxiliary relay 36 comprises a timing device for changing the operating range of the impedance relays.

The operating characteristic of the impedance relays 25, 26 and 27 has been described above in terms of impedance. It is convenient to represent this operating characteristic on the conventional impedance diagram illustrated in Fig. 3. The origin of the impedance diagram represents the physical location of the local terminal A of the protected subtransmission circuit, while the abscissa R and the ordinate $jX$ describe values of resistance and inductive reactance respectively as determined by the vectorial relationship between transmission line voltage and current measured at terminal A. Both coordinates R and $jX$ are scaled equally and in the same units, such as ohms, on a phase-to-neutral basis. A subtransmission line has a determinable impedance which is represented, for example, by a portion of a line L. The remote terminals B, C and D have been indicated on line L.

The circles identified in Fig. 3 by reference characters $Z_1$ and $Z_2$ represent the loci of the predetermined constant impedance values which define respectively the initial operating range and the extended operating range of the impedance relays. Whenever the apparent impedance of the subtransmission circuit, as indicated by the ratio of voltage and current quantities supplied by the current and potential transformers at terminal A, falls within the area defined by the operating range of an impedance relay, the restraining force has become less than operating force and the relay will operate. It is well known to those skilled in the art that under normal load conditions the apparent impedance of the subtransmission circuit will fall outside the operating range of the relays, while upon the occurrence of any phase fault located on the protected portion of the subtransmission circuit, the apparent impedance will instantly change to a value which results in relay operation.

The initial operating range of each impedance relay is set so that circle $Z_1$ intersects line L at a predetermined point E which represents the impedance of the subtransmission line at a point located just short of terminal B, as is shown in Fig. 3. The distance from local terminal A to point E, which may be, for example, ninety percent of the total distance between terminals A and B, is the initial reach of the impedance relay. The impedance relay operates substantially instantaneously in response to a phase fault condition on this predetermined portion of the subtransmission line to provide first zone protection. The relatively short distance between point E and terminal B is necessary to assure selective operation with regard to the protective relaying systems of adjoining subtransmission line sections.

The extended operating range of an impedance relay is adjusted so that circle $Z_2$ intersects line L at a predetermined point F which represents the impedance of the subtransmission line at a point located beyond terminal D as can be seen in Fig. 3. The distance from local terminal A to point F is the second zone reach of the impedance relay. Whenever a phase fault condition develops on the line between points E and F, the operating range of the relay may be changed from its initial amount after a fixed time determined by timing device 39, and the impedance relay will then operate substantially instantaneously to provide back-up protection.

The operating and restraining windings of the impedance relays 25, 26 and 27 are arranged so that each relay will respond to phase-to-phase faults involving a different pair of phase conductors. Relay 25 responds to faults between phase conductors 11a and 11b, relay 26 responds to faults between phase conductors 11b and 11c, and relay 27 responds to faults between phase conductors 11c and 11a. With the various operating windings connected as illustrated in Fig. 2, the operating characteristic described above remains essentially the same during either phase-to-phase or three-phase fault conditions.

It should be apparent that the impedance relays are incapable of directional discrimination. However, the directional unit 21 prevents operation of my relaying system under fault conditions located on the unprotected portions of the subtransmission circuit behind terminal A or in the third quadrant of Fig. 3. The operating characteristic of the directional unit 21 is represented in Fig. 3 by straight line 42, and the relaying system is operable to trip the circuit interrupter 13 only in response to impedance values falling within the illustrated solid-line semi circles.

From the foregoing detailed description of the components and circuitry of my relaying system, its mode of operation may now be readily followed. Assume first that phase conductors 11a and 11b are short circuited at some point within the initial reach of impedance relay 25. Contact 21a of directional unit 21 will be closed since electric power is flowing into the protected circuit. Impedance relay 25 will operate instantly to close its contact 25a. With both contacts 21a and 25a closed, the tripping circuit is completed and circuit interrupter 13 is tripped to isolate the faulted subtransmission line section 11 from the source of generation.

Assume now that a similar fault occurs on subtransmission line section 12. Contact 21a of directional unit 21 is again closed, but since the fault is beyond the normal reach of impedance relay 25, contact 25a can not close immediately. However, the instantaneous overcurrent units 22 and 23 will respond to the fault current which is greater than the predetermined magnitude of current required to operate these units. The closure of either contact 22a or 23a in conjunction with the closed contact 21a of directional unit 21 energizes timing element 39 which, after the predetermined time interval, closes its contact 38 to energize auxiliary relay 37 thereby opening shunting contacts 33, 34 and 35. As a result, a predetermined amount of additional resistance is inserted in series with the restraining winding 25d of impedance relay 25. A smaller proportion of subtransmission line voltage is now supplied to the restraining winding, thereby in effect increasing the ohmic reach of relay 25. The amount of fault current required to produce sufficient force in the operating windings 25d and 25c to cause relay operation is now less than initially, and accordingly the relay reach is extended. Since the fault on line section 12 is within the extended or second zone reach of impedance relay 25, the relay will now operate instantly to close its contact 25a. Closure of contact 25a completes the tripping circuit thereby energizing trip coil 14 of circuit interrupter 13. The delayed operation of the relaying system at terminal A allows time for the relaying system at terminal C to operate thereby isolating the faulted subtransmission line section 12 before the back-up protection provided by the relaying system at terminal A takes effect.

The overall operating characteristic of the relaying system at terminal A is illustrated graphically in Fig. 4. As indicated by line 43, a phase fault within the initial operating range of the impedance relays causes substantially instantaneous operation. Line 44 in Fig. 4 shows that for any phase fault occurring on the adjoining subtransmission line section 12, the relaying system at terminal A operates after the fixed time determined by element 39. As long as the instantaneous overcurrent units are set below the magnitude of minimum fault current under minimum generation conditions, changes in connected generation capacity will not substantially affect the operating time of my relaying system. It should be readily apparent that it is a relatively simple matter to obtain complete selectivity between the relaying systems of the various subtransmission line terminals by suitable adjustments of the respective fixed time delays.

While I have shown and described a preferred form of my invention by way of illustration, many modifications will occur to those skilled in the art. I therefore contemplate by the appended claims to cover all such modifications as fall within the true spirit and scope of my invention.

What I claim as new and desire to secure by Letters Patents of the United States is:

1. In a relaying system for protecting an electric power transmission circuit provided with an electroresponsively tripped circuit interrupter, relay means comprising a distance element and a directional element connected for tripping the circuit interrupter only in response to a fault on the protected circuit, said relay means having a predetermined initial operating range and a predetermined extended operating range, and time-overcurrent means operable after a predetermined fixed time delay in response to the current in the circuit exceeding a predetermined magnitude to change the operating range of said relay means.

2. In a relaying system for protecting an electric power transmission line having an electroresponsively tripped circuit interrupter at one end thereof, an instantaneous impedance relay energized by line current and voltage and having normal and extended predetermined operating ranges, a directional unit operable in response to the flow of electric power into the protected line, an instantaneous overcurrent unit energized by line current and operable in response to greater than a predetermined magnitude of said line current, and a timing device operable in delayed response to the operation of both said directional and overcurrent units to change the operating range of said impedance relay, said circuit interrupter being tripped in response to the operation of both said impedance relay and said directional unit.

3. A relaying system for protecting an electric power transmission circuit connected to a source of alternating current by an electroresponsively tripped circuit interrupter comprising, an impedance relay, means connected to change relay reach from an initial amount to an extended amount, a directional unit operable in response to the flow of electric power into the protected circuit, an overcurrent unit operable in response to at least a predetermined magnitude of circuit current, and a timing element controlled by said directional and overcurrent units for actuating said relay reach changing means a predetermined time after operation of both said directional and overcurrent units, said circuit interrupter being tripped in response to the operation of both said impedance relay and said directional unit.

4. A relaying system for a section of an electric power transmission system having an electro-responsively tripped circuit interrupter at one end of the section comprising, a substantially instantaneously operable impedance relay having an initial reach extending from said one end to a predetermined point of the section, a directional unit operable substantially instantaneously in response to the flow of alternating current into the section, an overcurrent unit operable substantially instantaneously in response to at least a predetermined magnitude of section current, and a timing device operable a predetermined time after operation of both said directional and overcurrent units to change the reach of said impedance relay from its initial value, said circuit interrupter being tripped in response to the operation of both said impedance relay and said directional unit.

5. In a relaying system for protecting an electric power transmission line having an electro-responsively tripped circuit interrupter at one end thereof, an impedance relay operable in response to a line fault occurring within its reach, said impedance relay having an initial reach which extends from said one end to a predetermined point on the protected line, a directional unit operable in response to electric power flow in a predetermined direction, an overcurrent unit operable in response to at least a predetermined magnitude of line current, and means including a timing device responsive with a predetermined time delay to operation of both said directional and overcurrent units to increase the reach of said impedance relay, said circuit interrupter being tripped upon operation of said impedance relay and said directional unit in response to a fault condition occurring within the reach of said impedance relay.

6. In a relaying system for protecting an electric power transmission line having an electro-responsively tripped circuit interrupter at one end thereof, a distance relay of the impedance type having an initial operating range including a predetermined portion of the protected line and an extended operating range including a greater portion of the line, a directional unit operable in response to electric power flow in a predetermined direction, an overcurrent unit operable in response to at least a predetermined magnitude of line current, and a timing device operable a predetermined time after operation of both said directional and over-current units to change the operating range of said distance relay from said initial to said extended amount, said circuit interrupter being tripped by operation of said distance relay and said directional unit upon the occurrence of a fault condition within the operating range of said distance relay.

7. A relaying system for a section of an electric power transmission system having an electro-responsively tripped circuit interrupter at one end of the section comprising, a fault responsive distance relay of the impedance type having preselected initial and extended ohmic reaches, a directional unit operable in response to electric power flow in a predetermined direction, an overcurrent unit connected to be operably energized in response to at least a predetermined magnitude of current in the section, and a timing device responsive with a predetermined time delay to operation of both said directional and overcurrent units for changing the ohmic reach of said distance relay, said circuit interrupter being tripped in response to a fault which effects operation of said distance relay and said directional unit.

8. A relaying system for protecting an electric power transmission circuit connected to a source of alternating current by an electroresponsively tripped circuit interrupter comprising, a fault responsive impedance relay provided with a winding connected to be energized in accordance with the circuit voltage, a directional unit operable in response to the flow of alternating current into the protected circuit, an overcurrent unit operable in response to at least a predetermined magnitude of circuit current, and means including a timing device operable a predetermined time after operation of both said directional and overcurrent units to decrease by a predetermined proportion the voltage supplied to the voltage winding of said impedance relay, said circuit interrupter being tripped in response to a fault which effects operation of said impedance relay and said directional unit.

9. In a relaying system for protecting a polyphase electric power circuit including an electro-responsively tripped multipole circuit interrupter, a plurality of impedance relays each being associated with a different phase of the circuit and each having predetermined initial and extended operating ranges, a directional unit operable in response to electric power flow into the protected circuit, a plurality of overcurrent units each being coupled to a different phase of the circuit and operable in response to at least a predetermined magnitude of current in the associated phase, and a timing device operable in delayed response to the operation of said directional unit and any one of said overcurrent units for increasing the operating range of all of said impedance relays, said circuit interrupter being tripped in response to the operation of said directional unit and any one of said impedance relays.

References Cited in the file of this patent

UNITED STATES PATENTS

| | | |
|---|---|---|
| 1,839,467 | Crichton | Jan. 5, 1932 |
| 2,214,866 | Warrington | Sept. 17, 1940 |